United States Patent
Sharma et al.

(10) Patent No.: US 11,283,777 B2
(45) Date of Patent: Mar. 22, 2022

(54) WIRELESS TELECOMMUNICATIONS APPARATUS AND METHODS

(71) Applicant: Convida Wireless, LLC, Wilmington, DE (US)

(72) Inventors: Vivek Sharma, Basingstoke (GB); Martin Warwick Beale, Basingstoke (GB); Shin Horng Wong, Basingstoke (GB); Brian Alexander Martin, Basingstoke (GB)

(73) Assignee: Convida Wireless, LLC, Wilmington, DE (US)

(*) Notice: Subject to any disclaimer, the term of this patent is extended or adjusted under 35 U.S.C. 154(b) by 249 days.

(21) Appl. No.: 16/498,476

(22) PCT Filed: Mar. 27, 2018

(86) PCT No.: PCT/EP2018/057768
§ 371 (c)(1),
(2) Date: Sep. 27, 2019

(87) PCT Pub. No.: WO2018/178075
PCT Pub. Date: Oct. 4, 2018

(65) Prior Publication Data
US 2020/0107189 A1    Apr. 2, 2020

(30) Foreign Application Priority Data
Mar. 30, 2017 (EP) .................... 17163832.3

(51) Int. Cl.
*H04L 29/06* (2006.01)
*H04L 9/12* (2006.01)
(Continued)

(52) U.S. Cl.
CPC ............ *H04L 63/0435* (2013.01); *H04L 9/12* (2013.01); *H04W 12/03* (2021.01);
(Continued)

(58) Field of Classification Search
CPC ... H04L 63/0435; H04L 9/12; H04L 2209/80; H04W 12/03; H04W 36/0038
See application file for complete search history.

(56) References Cited

U.S. PATENT DOCUMENTS 6,138,020 A * 10/2000 Galyas ................. H04W 36/18
370/331
2017/0311208 A1 * 10/2017 Yu ...................... H04W 36/0016

FOREIGN PATENT DOCUMENTS

| WO | WO-2010101442 A2 * | 9/2010 | ........ H04W 36/0083 |
| WO | WO-2014172836 A1 * | 10/2014 | ........... H04W 76/12 |
| WO | 2018/172383 A1 | 9/2018 | |

OTHER PUBLICATIONS

Harri Holma, et al., "LTE for UMTS: OFDMA and SC-FDMA Based Radio Access", Wiley 2009, ISBN 978-0-470-99401-6, 8pp.
(Continued)

*Primary Examiner* — Shawnchoy Rahman
(74) *Attorney, Agent, or Firm* — BakerHostetler

(57) ABSTRACT

A first network access node for use with a handover procedure for a terminal device involving the first network access node and a second network access node. The first network access is configured to receive a block of uplink data from the terminal device and establish whether the block of data has been ciphered by the terminal device using a cipher key corresponding to a first cipher key or to a second cipher key. In response to establishing the block of data has been ciphered using a cipher key corresponding to the first cipher key, decipher the block of data using the first cipher key. In response to establishing the block of data has been ciphered using a cipher key corresponding to the second cipher key, forward the block of data to the second network access node.

14 Claims, 7 Drawing Sheets

(51) Int. Cl.
*H04W 36/00* (2009.01)
*H04W 12/03* (2021.01)
*H04W 12/0431* (2021.01)

(52) U.S. Cl.
CPC ... *H04W 12/0431* (2021.01); *H04W 36/0038* (2013.01); *H04L 2209/80* (2013.01)

(56) References Cited

OTHER PUBLICATIONS

International Search Report and Written Opinion dated May 17, 2018 for PCT/EP2018/057768 filed on Mar. 27, 2018, 10 pages.
3GPP, "LTE; Evolved Universal Terrestrial Radio Access (E-UTRA) and Evolved Universal Terrestrial Radio Access Network (E-UTRAN); Overall description; Stage 2", 3GPP TS 36.300 version 13.2.0 Release 13, Jan. 2016, pp. 1-298.
Ericsson, "Conditional Handover", 3GPP TSG-RAN WG2 #97 Tdoc R2-1700864 Update of R2-1700544, Athens, Greece, Jan. 13-17, 2017, pp. 1-5.
Samsung, "Introduction of UE autonomous mobility", 3GPP TSG-RAN WG2 Meeting No. 97, R2-1701360 Resubmission of R2-1700400, Athens, Greece, Feb. 13-17, 2017, 3 pages.
Ericsson, "Remaining issues for PDCP key change for HO when LWA configuration is kept", 3GPP TSG-RAN WG2 Meeting No. 97, R2-1701621, Athens, Greece, Feb. 13-17, 2017, pp. 1-4.
Intel Corporation, "NW controlled autonomous handover in single connectivity", 3GPP TSG RAN WG2 Meeting No. 97, R2-1701711 Revision of R2-1700341, Athens, Greece Feb. 13-17, 2017, pp. 1-4.
Intel Corporation et al., "Further details of PDCP key change mechanism using LWA End-Marker with last SN", 3GPP TSG RAN WG2 Meeting No. 97, R2-1701939, Athens, Greece, Feb. 13-17, 2017, pp. 1-7.
Ericsson, "LTE-WLAN Aggregation Architecture", 3GPP TSG-RAN WG3 #89, Beijing China, Aug. 24-28, 2015, R3-151637, 5 pages.
NTT Docomo, "New SID Proposal: Study on New Radio Access Technology", 3GPP TSG RAN Meeting No. 71 RP-160671, Göteborg, Sweden, Mar. 7-10, 2016, 8 pages.
3GPP TS 36.300, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", 3GPP Standard ; Technical Specification ; 3GPP TS 36.300, Mar. 23, 2017, vol. RAN WG2, No. V14.2.0, pp. 1-334.
Sasha Sirotkin: "White Paper LTE-WLAN Aggregation (LWA): Benefits and Deployment Considerations Next Generation and Standards Group Author", Apr. 1, 2016.

\* cited by examiner

WIRELESS TELECOMMUNICATIONS APPARATUS AND METHODS

CROSS-REFERENCE TO RELATED APPLICATIONS

The present application is based on PCT filing PCT/EP2018/057768, filed Mar. 27, 2018, which claims priority to EP 17163832.3, filed Mar. 30, 2017, the entire contents of each are incorporated herein by reference.

BACKGROUND

Field

The present disclosure relates to wireless telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance. Other types of device, for example supporting high-definition video streaming, may be associated with transmissions of relatively large amounts of data with relatively low latency tolerance. Yet other types of device, for example used for autonomous vehicle communications, may be characterised by data that should be transmitted through a network with very low latency and very high reliability. A single device type might also be associated with different data traffic profiles/characteristics depending on the application(s) it is running. For example, different consideration may apply for efficiently supporting data exchange with a smartphone when it is running a video streaming application (high downlink data) as compared to when it is running an Internet browsing application (sporadic uplink and downlink data) or being used for voice communications by an emergency responder in an emergency scenario.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles and data transfer requirements, for example in terms of latency and/or reliability targets. See, for example, the 3GPP document RP-160671, "New SID Proposal: Study on New Radio Access Technology," NTT DOCOMO, RAN#71 [1].

The introduction of new radio access technology (RAT) systems/networks gives rise to new challenges for providing efficient operation for devices operating in new RAT networks, including devices able to operate in both new RAT networks (e.g. a 3GPP 5G network) and currently deployed RAT networks (e.g. a 3GPP 4G network).

One particular area where new approaches may be helpful is in relation to handovers between network nodes responsible for communicating with a terminal device, which may be referred to as mobility management. It will be appreciated handovers may result from a device physically moving between coverage areas of different cells or from changing radio conditions associated with different cells for a static device, and the term mobility management may be used for both scenarios.

In view of the above, there is a desire for new approaches for handling mobility in wireless telecommunications systems.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
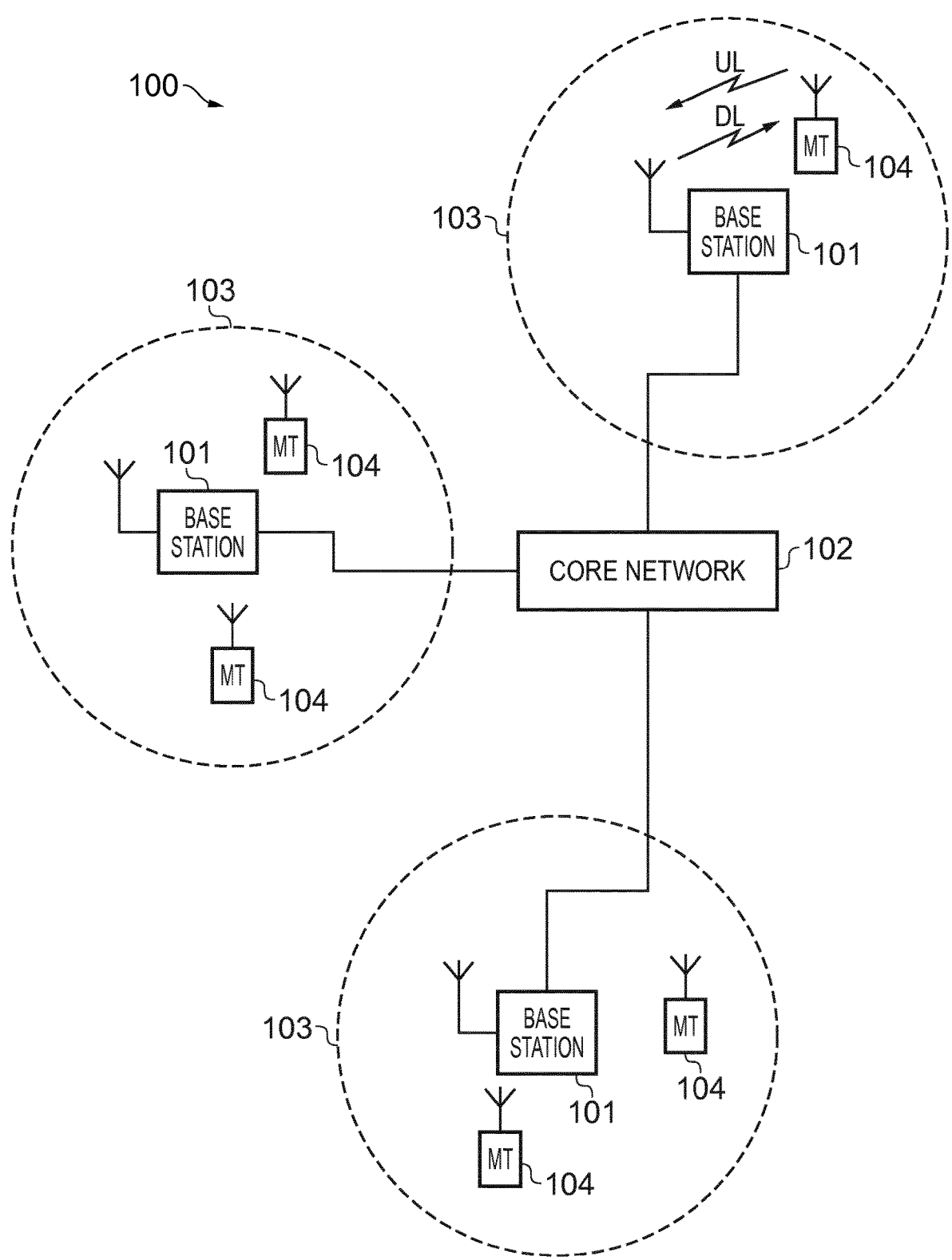
FIG. 1 schematically represents some aspects of a LTE-type wireless telecommunication network which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs, g-nodeBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity particular terminology may be used regardless of the underlying network architecture. That is to say, the use of a specific term in relation to certain example implementations is not intended to indicate these implementations are limited to a certain generation of network that may be most associated with that particular terminology.

Figure 2:
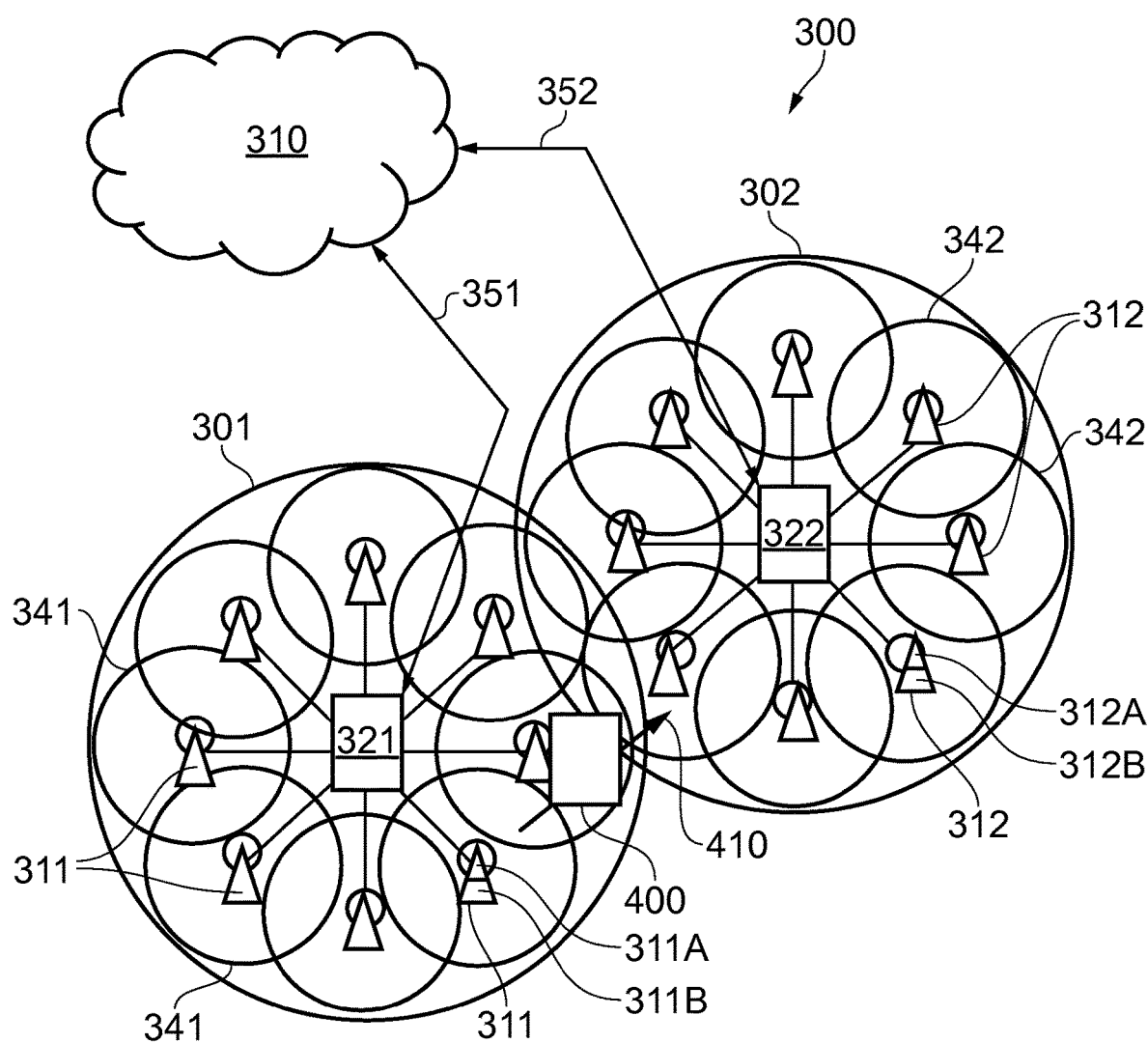
FIG. 2 schematically represents some aspects of a new radio access technology (RAT) wireless telecommunications network which may be configured to operate in accordance with certain embodiments of the present disclosure.

FIG. 2 is a schematic diagram illustrating a network architecture for a new RAT wireless mobile telecommunications network/system 300 based on previously proposed approaches which may also be adapted to provide functionality in accordance with embodiments of the disclosure described herein. The new RAT network 300 represented in FIG. 2 comprises a first communication cell 301 and a second communication cell 302. Each communication cell 301, 302, comprises a controlling node (centralised unit) 321, 322 in communication with a core network component 310 over a respective wired or wireless link 351, 352. The respective controlling nodes 321, 322 are also each in communication with a plurality of distributed units (radio access nodes/remote transmission and reception points (TRPs)) 311, 312 in their respective cells. Again, these communications may be over respective wired or wireless links. The distributed units 311, 312 are responsible for providing the radio access interface for terminal devices connected to the network. Each distributed unit 311, 312 has a coverage area (radio access footprint) 341, 342 which together define the coverage of the respective communication cells 301, 302.

In terms of broad top-level functionality, the core network component 310 of the new RAT telecommunications system represented in FIG. 2 may be broadly considered to correspond with the core network 102 represented in FIG. 1, and the respective controlling nodes 321, 322 and their associated distributed units/TRPs 311, 312 may be broadly considered to provide functionality corresponding to base stations of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 400 is represented in FIG. 2 within the coverage area of the first communication cell 301. This terminal device 400 may thus exchange signalling with the first controlling node 321 in the first communication cell via one of the distributed units 311 associated with the first communication cell 301. In some cases communications for a given terminal device are routed through only one of the distributed units, but it will be appreciated in some other implementations communications associated with a given terminal device may be routed through more than one distributed unit, for example in a soft handover scenario and other scenarios. The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 321 is responsible for determining which of the distributed units 311 spanning the first communication cell 301 is responsible for radio communications with the terminal device 400 at any given time (i.e. which of the distributed units are currently active distributed units for the terminal device). Typically this will be based on measurements of radio channel conditions between the terminal device 400 and respective ones of the distributed units 311. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In the example of FIG. 2, two communication cells 301, 302 and one terminal device 400 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment may comprise a control unit/controlling node 321, 322 and/or a TRP 311, 312 of the kind shown in FIG. 2 which is adapted to provide functionality in accordance with the principles described herein.

As already noted, mobile communications networks such as the network 100 shown in FIG. 1 and the network 300 shown in FIG. 2 may be expected to support a wide range of services having different requirements, for example in terms of data rate, latency and/or reliability targets for the different services. One example use case currently considered to be of interest for next generation wireless communication systems includes so-called Ultra Reliable and Low Latency Communications (URLLC) [1].

URLLC services may be typically characterised as low latency services, for example aiming to transmit relatively small amounts of data through the radio network with a 1 ms packet transit time (i.e. so that each piece of URLLC data needs to be scheduled and transmitted across the physical layer in a time that is shorter than 1 ms) with high reliability, for example with a 99.999% reliability target. URLLC services may, for example, be applicable for safety-relevant communications, for example, communications relating to autonomous vehicle (driverless car) applications. Although certain embodiments of the disclosure may be described with reference to URLLC for convenience of terminology, it will be appreciated the principles and approaches described herein are not only applicable to URLLC services as currently proposed, but are generally applicable, in particular, but not exclusively, to services having the similar characteristics to URLLC services, for example in respect of a desire for low latency.

It has been proposed that uplink transmissions with relatively stringent latency requirements, such as for URLLC data, might in some situations be made using grant-free (non-allocated) radio resources. That is to say, a terminal device itself might autonomously select radio resources to use for transmitting an uplink data block, e.g. in terms of physical time and frequency resources, from among a predefined pool of available radio resources configured to support such grant-free transmissions. This is in contrast to the more common allocated/granted resources approach in which terminal devices receive resource allocation signalling (resource grants) from network infrastructure equipment/network access nodes to indicate the radio resources the terminal device should use for transmissions of uplink data to the network. An advantage of grant-free resource approaches is lower latency as a terminal device does not need to wait to receive an allocation of uplink radio resources to use before it can start transmitting data which has become available for uplink. An advantage of granted resource approaches is the potential for improved overall efficiency in resource utilization as the entity responsible for allocating resources can allocate resources as and when needed and does not need to reserve a pool of resource to remain available for grant-free access that may not always be needed. Some implementations may support both grant-free and granted resource approaches for uplink transmissions for certain types of data, such as URLLC data. For example, a regular predictable URLLC transmission might be made using allocated resources while an irregular unpredictable URLLC transmission might be made using grant-free resources.

The inventors have recognised there are new issues to consider with using grant-free resources for uplink transmissions while a terminal device is in the vicinity of a boundary region between two communication cells, for example in situations of potential handover between radio network access nodes responsible for communicating with the terminal device in the two cells. In this regard it will be appreciated handovers may result from a device physically moving between coverage areas associated with different radio access nodes or from changing radio conditions associated with different cells for a static device, and the term mobility management may be used in relation to both scenarios.

In a handover procedure a terminal device is moved (handed over) from communicating with a first network access node (e.g. an LTE base station or 5G controlling unit) to communicating with a second network access node (e.g. another LTE base station or 5G controlling unit). The first network access node may be referred to as the source for the handover and the second network access node may be referred to as the target for the handover. A terminal device will typically be handed over from a source network access node to a target network access node because changing radio channel conditions mean the target network access node is better able to serve the terminal device than the source network access node, e.g. because the terminal device is moving. However, a handover may also be initiated for other reasons, for example for load balancing.

Many wireless telecommunications systems adopt a "break-before-make" approach to handovers. That is to say, the terminal device disconnects from the source network access node before connecting to the target network access node using a connection procedure. The inventors have recognised this can in some respects be detrimental for transmissions of some data, for example delay-sensitive data (e.g. URLLC data). This is because there is a time window between when the terminal device disconnects from the source network access node and when the terminal device has completed its connection procedure with the target network access node during which the terminal device is unable to transmit uplink data. This means if data for uplink should become available in this time window, it may not be possible to transmit the data within a target latency threshold. It has been proposed to adopt a "make-before-break" approach to handovers to support URLLC services and other services having relatively stringent latency requirements. Proposals include conditional handover approaches (see, for example, "Conditional Handover", 3GPP TSG RAN WG2 Meeting #97, R2-1700864, Athens, Greece 13- 17 Feb. 2017 [3]) and autonomous (network driven) handover approaches (see, for example, "NW controlled autonomous handover in single connectivity", 3GPP TSG RAN WG2 Meeting #97, R2-1701711, Athens, Greece 13-17 Feb. 2017 [4] and "Introduction of UE autonomous mobility", 3GPP TSG RAN WG2 Meeting #97, R2-1701360, Athens, Greece 13-17 Feb. 2017 [5]). In proposed conditional handover approaches a terminal device might only hand over to a target cell if a signal quality of the serving (source) cell is below a predefined threshold and a signal quality of the target cell is above a predefined threshold. A conditional handover can help prevent a terminal from handing over too early or too late into the target cell, which could cause ping-ponging or radio link failure between the target and serving cells.

Thus, with a "make-before-break" approach, a terminal device does not lose the ability to transmit uplink data during a handover, but instead may transmit to two network access nodes during the handover procedure. Downlink data for the terminal device during the handover procedure may thus be routed from the core network to the terminal device via both network access nodes and the terminal device may thus receive the data via one or other, or both, network access nodes. If the terminal device successfully receives the data from both network access nodes, it may simply discard one copy of the data. Similarly, uplink data from the terminal device during the handover procedure may be transmitted to the core network via both network access nodes, which can help increase macro diversity. The core network may then discard one of the versions of the data or, with appropriate intercommunication between the two network access nodes, one network access node may instruct the other not to forward the data received from the terminal device to the core network if it is going to do so itself. In some cases, the uplink packets received by more than one network access node may be combined (e.g. via a selective combining procedure) with inter-communication between the network access nodes, or at a higher level of hierarchy than the network access nodes that support baseband and MAC processing. The combined packets may then be sent by one or other or both of the network access nodes to the core network.

Figure 3:
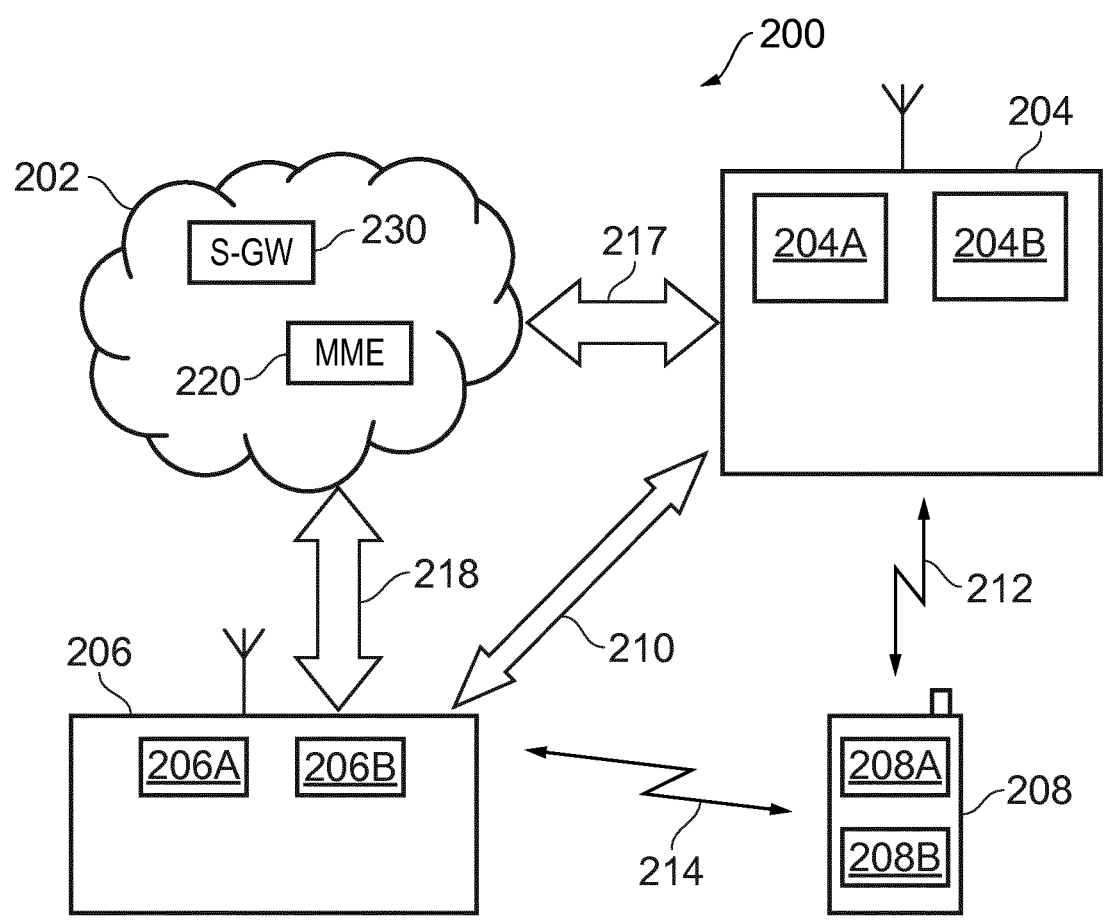
FIG. 3 schematically represents some aspects of a wireless telecommunication system in accordance with certain embodiments of the present disclosure.

FIG. 3 schematically represents some aspects of a wireless telecommunications system 200 configured to operate to support a terminal device 208 approaching a handover from a source network access node 204 to a target network access node 206 in accordance with certain embodiments of the disclosure. Aspects of the architecture and operation of the telecommunications system 200 which are not specifically described herein may be implemented in accordance with any previously proposed techniques, for example according to current 3GPP standards and other proposals for operating wireless telecommunications systems/networks. The network access nodes 204, 208 may, for convenience, sometimes be referred to herein as base stations 204, 208, it being understood this term is used for simplicity and is not intended to imply the network access nodes should conform to any specific network architecture, but on the contrary, these elements may correspond with any network infrastructure equipment/network access node that may be configured to provide functionality as described herein. In that sense it will appreciated the specific network architecture in which embodiments of the disclosure may be implemented is not of primary significance to the principles described herein.

The telecommunications system 200 comprises a core network part (evolved packet core) 202 coupled to a radio network part. The radio network part comprises the source network access node 204, the target network access node 206, and the terminal device 208. In this example, two network infrastructure elements 204, 206 and one terminal device 208 are shown for simplicity, but it will of course be appreciated that in practice the radio network part may comprise a larger number of base stations serving a larger number of terminal devices across various communication cells.

As with a conventional mobile radio network, the terminal device 208 is arranged to communicate data to and from the network access nodes (base stations/transceiver stations) 204, 206. Typically the terminal device will be connected to (i.e. able to exchange user plane data with) one network infrastructure element at a time. However, a terminal device may in some cases be simultaneously connected to both the first and second network nodes, in particular when it is operating in a region where there is the potential for a handover to occur, i.e. when the terminal device is in a boundary region between the geographic footprints associated with the radio coverage (cells) of the respective network nodes. The network access nodes 204, 206 are communicatively connected via respective communication links 217, 218 to the core network part 202, and in particular to a serving gateway, S-GW, 230 in the core network part 202 arranged to perform routing and management of mobile communications services to the terminal devices in the telecommunications system 200 via the network access nodes 204, 206. In order to maintain mobility management and connectivity, the core network part 202 also includes a mobility management entity, MME, 220 which manages the enhanced packet service, EPS, connections with the terminal device 208 operating in the communications system based on subscriber information stored in a home subscriber server, HSS. Other network components in the core network in this example implementation (not shown for simplicity) include a policy charging and resource function, PCRF, and a packet data network gateway, PDN-GW, which provides a connection from the core network part 202 to an external packet data network, for example the Internet. As noted above, the operation of the various elements of the communications system 200 shown in FIG. 3 may be broadly conventional apart from where modified to provide functionality in accordance with embodiments of the present disclosure as discussed herein.

The source network infrastructure element/access node 204 comprises transceiver circuitry 204a (which may also be referred to as a transceiver/transceiver unit) for transmission and reception of wireless signals and processor circuitry 204b (which may also be referred to as a processor/processor unit) configured to control the source network infrastructure element 204 to operate in accordance with embodiments of the present disclosure as described herein. The processor circuitry 204b may comprise various sub-units for providing functionality in accordance with embodiments of the present disclosure as explained further herein. These sub-units may be implemented as discrete hardware elements or as appropriately configured functions of the processor circuitry. Thus, the processor circuitry 204b may comprise circuitry which is suitably configured/programmed to provide the desired functionality described herein using conventional programming/configuration techniques for equipment in wireless telecommunications systems. The transceiver circuitry 204a and the processor circuitry 204b are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the source network infrastructure element 204 will in general comprise various other elements associated with its operating functionality, such as a scheduler. For example, although not shown in FIG. 3 for simplicity, the processor circuitry 204b may comprise scheduling circuitry, that is to say the processor circuitry 204b may be configured/programmed to provide the scheduling function for the source network infrastructure element 204.

The target network infrastructure element/access node 206 comprises transceiver circuitry 206a (which may also be referred to as a transceiver/transceiver unit) for transmission and reception of wireless signals and processor circuitry 206b (which may also be referred to as a processor/processor unit) configured to control the target network infrastructure element 206 to operate in accordance with embodiments of the present disclosure as described herein. The processor circuitry 206b may comprise various sub-units for providing functionality in accordance with embodiments of the present disclosure as explained further herein. These sub-units may be implemented as discrete hardware elements or as appropriately configured functions of the processor circuitry. Thus, the processor circuitry 206b may comprise circuitry which is suitably configured/programmed to provide the desired functionality described herein using conventional programming/configuration techniques for equipment in wireless telecommunications systems. The transceiver circuitry 206a and the processor circuitry 206b are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). For example, although not shown in FIG. 3 for simplicity, the processor circuitry 206b may comprise scheduling circuitry, that is to say the processor circuitry 206b may be configured/programmed to provide the scheduling function for the target network infrastructure element 206.

The terminal device 208 is adapted to support operations in accordance with embodiments of the present disclosure when communicating with the network access nodes 204, 206, and in particular when operating in a region when there is the potential for being handed off between them, as discussed further herein. The terminal device 208 comprises transceiver circuitry 208a (which may also be referred to as a transceiver/transceiver unit) for transmission and reception of wireless signals and processor circuitry 208b (which may also be referred to as a processor/processor unit) configured to control the terminal device 208. The processor circuitry 208b may comprise various sub-units/sub-circuits for providing functionality in accordance with embodiments of the present disclosure as described herein. These sub-units may be implemented as discrete hardware elements or as appropriately configured functions of the processor circuitry. Thus the processor circuitry 208b may comprise circuitry which is suitably configured/programmed to provide the desired functionality described herein using conventional programming/configuration techniques for equipment in wireless telecommunications systems. The transceiver circuitry 208a and the processor circuitry 208b are schematically shown in FIG. 3 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the terminal device 208 will in general comprise various other elements associated with its operating functionality, for example a power source, user interface, and so forth, but these are not shown in FIG. 3 in the interests of simplicity.

Thus for the example implementation scenario represented in FIG. 3 it is assumed the terminal device 208 is connected to the source network access node 204 over a radio path 212 and has moved to a location in which it may be handed over to the target network access nodes 206, e.g. due to mobility, so that it may communicate with the target network access node over the radio path 214. The specific procedure for determining if the terminal device should in fact be handed over may be based on conventional techniques, for example taking account of radio channel conditions associated with the respective radio paths 212, 214 and/or load balancing. A communications link 210 between the network access nodes 204, 206 is provided so they may exchange information, for example to support a handover procedure. In some network architectures the network nodes may communicate directly with one another, as schematically represented in FIG. 3, while in other network architectures they may communicate with one another indirectly via the core network part 202.

In accordance with certain embodiments of the disclosure, a terminal device that is operating in a region in radio coverage of multiple radio access nodes, for example where a handover from a first (source) network access node to a second (target) network access node might be expected to occur, may be configured to transmit at least a certain type of uplink data (e.g. delay intolerant data, such as URLLC data) using grant-free resources that are selected from a pool of available grant-free resources, wherein the pool of available grant-free resources are configured for use by both the first and second network access nodes (i.e. both network access nodes are monitoring and able to receive uplink transmissions made using the shared pool of grant-free resources). Thus, the terminal device may undertake single transmissions of a data block (packet) using resources selected from this reserved set of grant-free resources that is shared by both network access nodes, and this transmission may be received by either, or both, of the network access nodes.

Put another way, in accordance with certain embodiments of the disclosure a wireless telecommunications system may be configured to include a shared grant-free resource pool that is common to at least two network access nodes, and in particular for a handover scenario, a shared grant-free resource pool that is common to at least a source network access node/cell and a target network access node/cell. Uplink transmissions using resources selected by the terminal device from within the shared resource pool (shared set of transmission resources) may thus be received by both network access nodes.

A terminal device may be configured to use resources from within the shared grant-free resource pool in association with a handover procedure. For example, in an implementation that adopts a make-before-break approach to handover, the terminal device may be configured to use resources selected from within the shared grant-free resource pool during the time it is connected to both network access nodes (i.e. after it has connected to the target network access node, but before it has disconnected from the source network access node). In an implementation that adopts a break-before-make approach to handover, the terminal device may be configured to start using resources selected from within the shared grant-free resource pool when it is determined a handover may be imminent, for example based on changing radio channel conditions associated with a radio communications path between the terminal device and one or other, or both, of the source and target network access nodes. More generally, regardless of the approach to handover (i.e. whether make-before-break or break-before-make), the terminal device may be configured to use resources selected from within the shared pool of grant-free resources based on a determination as to whether the terminal device is in a boundary region between the communication cells supported by the source and target access nodes.

In accordance with the principles set out above, and elsewhere herein, as well as in other scenarios, a terminal device may in some cases transmit uplink data to a network node with which the terminal device does not have layer 2 synchronisation, for example in the sense of not having an agreed layer 2 cipher key with respect to the network node. Certain embodiments of the disclosure are concerned with higher layer processing of data received in a network by different network access nodes in such scenarios, and similar scenarios, in particular in relation to processing in layer 2 of the network protocol stack, for example in relation to a packet data convergence protocol (PDCP) entities/layers.

In the context of a terminal device operating in a wireless telecommunications system, different scenarios may be considered for terminal devices having different capabilities in respect of their ability to simultaneously communicate data in different cells/with different network access nodes during a handover procedure, i.e. when switching from communicating with a source network access node supporting communications in a source cell to communicating with a target network access node supporting communications in a target cell:

(Scenario 1) Terminal devices with a single transmitter/receiver (transceiver) can perform transmissions configured for one cell at a time in the case of inter frequency handover (i.e. for an inter frequency target network access node/cell). In this case it may be expected in the terminal device's protocol stack a packet processing entity, e.g. a PDCP entity, will generate packets offline and based on a network's user plane architecture, a RLC (radio link control) entity will prepare packets for transmission offline, and a MAC (medium access control) entity will transmit the packets based on a received uplink grant. In this scenario there may be packets arriving at the terminal device's physical layer for uplink transmission which are ciphered using a source cell key, but the physical layer may have actually switched and synchronised to use the target cell resources. Conversely, there may be situations in which packets arriving at the terminal devices physical layer for uplink transmission are ciphered using the target cell key, but the physical layer may not yet have switched and synchronised to using physical layer resources that can be received in the target cell.

(Scenario 2) Terminal devices with dual transmitters/receivers (transceivers) may be initially configured with single connectivity and due to the terminal device mobility, may then be configured with dual connectivity if the target cell is operating on the same frequency or different frequency compared to the source cell (it has been proposed and agreed in 3GPP discussions that certain future wireless telecommunications system standards will support intra/inter frequency dual connectivity for URLLC and use packet duplication & dual connectivity during handover). (Scenario 3) In other scenarios, terminal devices with a single transmitter/receiver (transceiver) may be involved in an intra frequency handover (i.e. for an intra frequency target network access node/cell). In this case a terminal device should be able to transmit on the shared resources and both cells should be able to receive uplink transmission on shared resources. In this case there may be no benefit in using intra frequency DC to support handover, for example if the handover procedure itself does not give rise to acceptable long periods when a terminal device cannot transmit uplink data, for example by using a shared resource approach as discussed above. Because of this, it is possible that in certain wireless telecommunications systems a DC solution may not be adopted for coverage based handover cases.

It may be noted there may be no issues in deciphering uplink packets received at the network via different wireless access nodes if PDCP is not relocated during handover (for example in the case of a control unit controlling a handover between source and target cell distributed units in a network architecture of the kind represented in FIG. 2) because transmissions associated with both the source and target cell may be ciphered/deciphered with the same key and key change does not happen. However, issues may arise with regard to ensuring the network has access to the appropriate keys for ciphering/deciphering in situations where PDCP is relocated during handover, or where different keys may be associated with different cells having a common PDCP entity (for example in the case that security/cipher keys are linked to cell identity, as has been proposed).

As described further below, different approaches in accordance with certain embodiments of the disclosure may be adopted for supporting uplink communications for terminal devices having the above-discussed different capabilities in respect of their ability to simultaneously communicate data in different cells/with different network access nodes during a handover procedure, and in some cases in the context of an approach in which a shared grant free resource pool is made available for communicating with at least two network access nodes, wherein one of the network access nodes is associated with a serving cell for the terminal device and one of the network access nodes is associated with a target handover cell for the terminal device.

Certain embodiments of the present disclosure are thus primarily, although not exclusively concerned with Scenarios 1 and 3.

Scenario 1: Terminal Devices with a Single Transmitter/Receiver (Transceiver) in the Case of Inter Frequency Handover.

Figure 4:
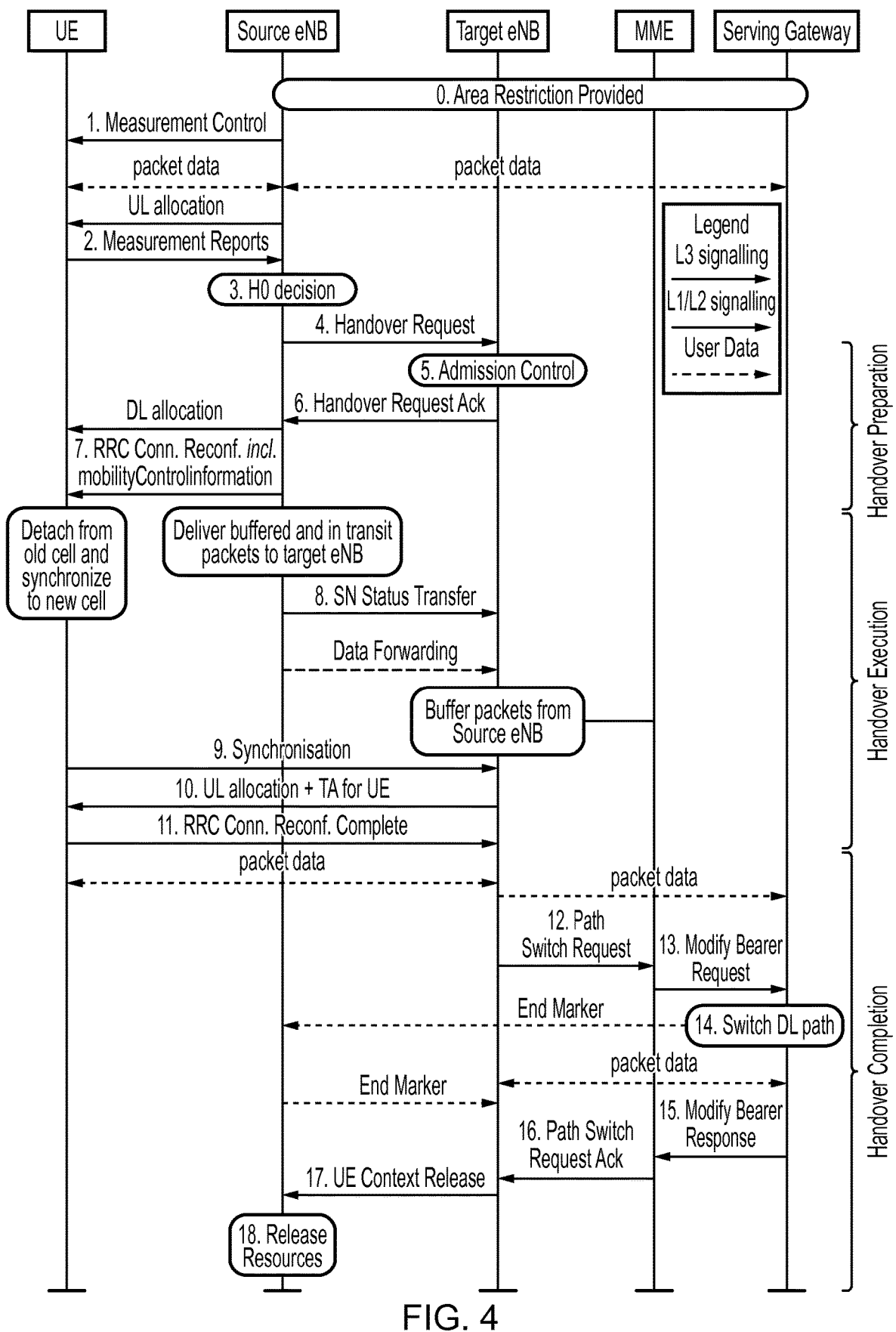
FIG. 4 is a signalling ladder diagram schematically representing aspects of a known handover procedure.

FIG. 4 is a ladder diagram showing signalling exchange between an RRC connected mode terminal device ("UE"), a source network access node ("Source eNB"), a target network access node ("target eNB"), a mobility management entity ("MME") and a serving gateway ("Serving Gateway") for a conventional Intra-MME/Serving gateway LTE handover procedure in a conventional LTE-based wireless telecommunications network. This procedure is well established and well understood and described in the relevant standards, for example, see ETSI TS 136 300 V13.2.0 (2016-01)/3GPP TS 36.300 version 13.2.0 Release 13 [6] (in particular Section 10.1), and so is not described in detail herein in the interest of brevity.

For a terminal device to transmit data to a network access node there is typically a need for coordination (synchronisation), at both the physical layer (layer 1) and at layer 2.

Synchronisation at the physical layer is needed so the network access node is able to receive the physical layer transmissions from the terminal device. In this regard it will be appreciated the term synchronisation as used in this context refers generally to the terminal device and the network access node being able to exchange physical layer signalling, and should not be interpreted only as requiring physical layer timing synchronisation.

Synchronisation in layer 2, on the other hand, is needed for the network access node and terminal device to share a cipher/security key which is used by a layer 2 packet processing entity in the terminal device to encipher uplink data transmissions and by a corresponding layer 2 packet processing entity in the network access node to decipher the uplink data transmissions. In this regard the layer 2 packet processing entity in the respective protocol stacks may comprise a packet data protocol convergence (PDCP) entity.

For terminological convenience, when the terminal device is transmitting data on physical resources that may be received by a network access node in layer 1, the terminal device and the network access node may be referred to as being layer 1 synchronised, and when the terminal device and network access node are configured to use the same cipher key they may be referred to as being layer 2 synchronised.

Referring to the steps of a conventional handover procedure as represented in FIG. 4, the terminal device and the target network access node will typically become layer 2 synchronised in association with the step labelled "11. RRC Conn. Recon. Complete". However, the terminal device and the target network access node will typically become layer 1 synchronised earlier in the processing, e.g. in association with the step labelled "9. Synchronisation".

Consequently, there can be a period of time during the handover process when the terminal device is layer 1 synchronised with the target network node, but is not yet layer 2 synchronised with the target network node. That is to say, the terminal device can be in a state in which it is configured to transmit uplink signalling which is receivable by the target network access node at layer 1, but which the target network access node cannot decipher at layer 2 because the corresponding data packets have been prepared/ciphered using the cipher key associated with the source network access node and not the target network access node. This period of time may be small, for example perhaps on the order of 10 or 20 ms, but this may be considered an unacceptable delay in some circumstances in respect of at least some classes of data, such as URLLC data.

Figure 5:
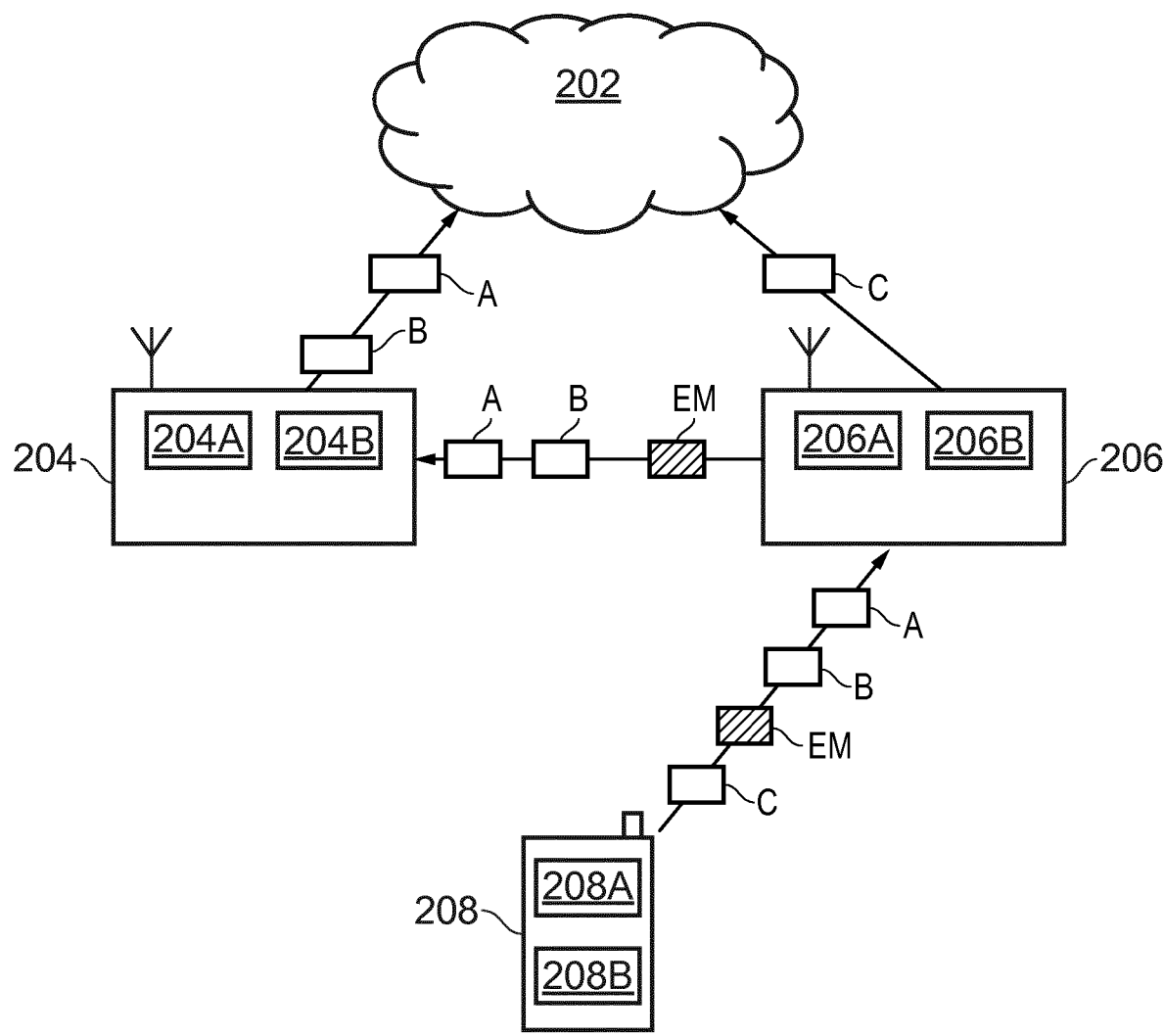
FIG. 5 schematically represents some aspects of uplink data transmissions in the wireless telecommunication system of FIG. 3 in accordance with certain embodiments of the present disclosure.

In accordance with certain embodiments of the disclosure this issue may be addressed using an approach as schematically represented in FIG. 5. FIG. 5, represents a process of transmitting uplink data from the terminal device 208 to the core network 202 in the wireless telecommunications system schematically represented in FIG. 3 around the time of a handover from the source network access node 204 to the target network access node 206. In this example it will be assumed the terminal device wishes to uplink three packets of data, namely packet A, packet B and packet C, as schematically represented in FIG. 5. Furthermore, it is assumed these three packets are all transmitted when the terminal device is physical layer (layer 1) synchronised to the target network access node 206, but the terminal device does not achieve layer 2 synchronisation with the target network access node 206 until after having transmitted packets A and B but before transmitting packet C. This means packets A and B will be ciphered with the source cell cipher key (since these packets are transmitted when the terminal device 208 is layer 2 synchronised to the source network access node) and packet C is be ciphered with the target cell cipher key. Thus the target network access node 206 receives all three packets A, B, C at layer 1, but cannot decode packets A and B in layer 2, but can decode packet C in layer 2.

To help address this issue in accordance with certain embodiments of the disclosure, the target network access node is configured to forward to the source network access node 204 the packets which it cannot decipher itself because they are ciphered with a source network access node security key, i.e. packets A and B in this example, as schematically represented in FIG. 5. Thus the source network access node receives packets A and B from the target network access node and is able to decode these in its layer 2 packet processing entity (e.g. PDCP layer) since this entity has access to the appropriate deciphering key. The data comprising packets A and B which are deciphered by the source network access node may then be forwarded to the core network, as schematically represented in FIG. 5. As regards packet C, because this is ciphered with the cipher key associated with the layer 2 packet processing entity (e.g. PDCP layer) in the target network access node (i.e. it is prepared for transmission after the terminal device and target network access node have achieved layer 2 synchronisation), the target network access node is able to decipher this packet in its layer 2 packet processing entity in the normal way and forward onto the core network, as schematically represented in FIG. 5.

To facilitate this operation, in accordance with certain embodiments of the disclosure, the terminal device 208 is configured to transmit an indicator, which may be referred to here as an end marker, to indicate when the terminal device changes from ciphering with a security key associated with the source network to ciphering with a security key associated with the target network, i.e. in effect transmitting an indication of when the terminal device becomes layer 2 synchronised. Thus in this example scenario the terminal device is configured to transmit the end marker after transmitting packet B and before transmitting packet C, as schematically indicated in FIG. 5 by the transmission shown with hatching and labelled "EM". On receiving the end marker indication the target network access node determines that subsequently received packets from the terminal device will be ciphered with the target network access node key and do not need to be forwarded to the source network access node. In some examples, the target network access node may be configured to also forward to the source network access node an indication the end marker has been received, as schematically indicated in FIG. 5. It is not necessary for the source network access node to receive the end marker, it can be helpful for the source network access node to be informed when it will no longer receive packets from the terminal device via the target network access node so that it can release any resources reserved for use in association with communications from the terminal device.

Scenario 3: Terminal Devices with a Single Transmitter/Receiver (Transceiver) in the case of Intra Frequency Handover.

Whether or not a handover is from a source cell to an inter frequency target cell or from a source of cells to an intra frequency target cell is not of primary significance to the approaches described herein, and in that regard corresponding approaches to those discussed above with regard to scenario 1 (terminal devices with a single transmitter/receiver (transceiver) in the case of inter frequency handover), can also be applied in regard to scenario 3 (terminal devices with a single transmitter/receiver (transceiver) in the case of intra frequency handover).

Approaches that use physical radio resources selected from a pool of shared resources which are common to the source network access node and the target network access node during handover, such as described above, may be considered to correspond in some respects to an intra frequency scenario in respect of transmissions made using the common pool of shared resources, even if subsequent transmissions following handover are inter frequency. Furthermore, for approaches that make use of shared physical resources that are common to the source network access node and the target network access node, the terminal device and the target network access node may, in effect, be considered to be layer 1 synchronised even earlier in the handover process than discussed above. This is because even before a step corresponding to the step labelled "9. Synchronisation" in FIG. 4, the terminal device is able to transmit uplink data using the shared/common pool of physical radio resources that the target network node can receive at layer 1.

One difference in an intra frequency scenario, as opposed to an inter frequency scenario, is that packets transmitted in uplink by the terminal device may be simultaneously received at layer 1 by both the source network access node and the target network access node. Referring to FIG. 5, if the source network access node were to also receive the transmissions of packets A and B, these could be decoded in layer 2 at the source network access node in the usual way because they are ciphered with the source key. However, the source network access node would not be able to decipher packet C in layer 2, because this is ciphered using the target key. Regardless of whether or not the source network access node can receive uplink packets on the physical layer which are also received by the target network access node, in accordance with certain approaches, the operation of the target network access node represented in FIG. 5 remains the same (since in the general case the target network access node will not know if the source network access node also received the uplink data). Thus, it is possible the source network access node may receive multiple copies of packets A and B, namely a first copy directly from the terminal device and a second copy via the target network access node. Different approaches may be taken in this situation. For example, the source network access node may simply discard one or other version of the packets for which it receives two copies, or the two copies may be combined, for example to increase redundancy.

Figure 6:
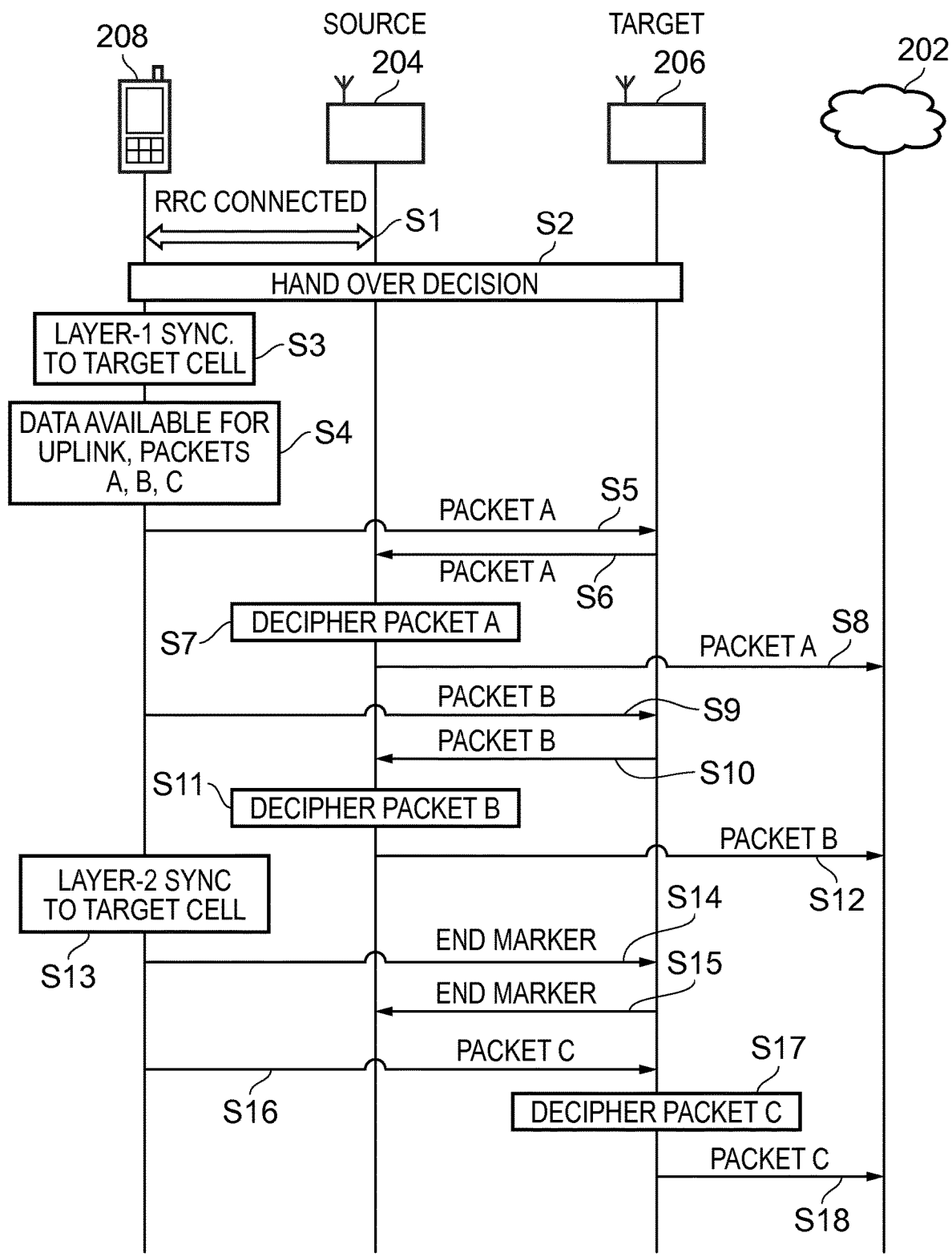
FIGS. 6 and 7 are signalling ladder diagrams schematically representing some operating aspects of wireless telecommunications networks/systems in accordance with certain embodiments of the disclosure.

FIG. 6 is a ladder diagram schematically representing some operating aspects of the wireless telecommunications system 200 as discussed above with reference to FIG. 5 in accordance with certain embodiments of the disclosure. In particular, the diagram represents some operations and signalling exchange associated with the terminal device 208, the source network access node 204, the target network access node 206 and the core network 202 in accordance with certain embodiments of the disclosure.

The processing represented in FIG. 6 starts in step S1 in which it is assumed the terminal device 208 is active on the source cell (i.e. the terminal device is RRC connected to the source network access node).

In step S2 it is determined the terminal device 208 should be handed over from the source cell to the target cell. The manner in which it is determined whether or not to hand over from the source cell to the target cell is not of primary significance to the principles described herein. For example, in accordance with certain implementations it may be based on conventional techniques, for example taking account of measurements of radio channel conditions between the terminal device and the respective network access nodes.

Following the decision to handover the terminal device from the source network access node to the target network access node, the terminal device achieves layer 1 synchronisation to the target cell. That is to say, the terminal device configures itself to be able to make uplink transmissions that are receivable by the target network access node at layer 1. This may involve, for example, switching to using a common/shared pool of resources for grant-free uplink transmissions of the kind discussed above, or a more conventional approach.

In step S4 the terminal device determines that data has become available for uplink. In this example it is assumed the amount of data is such that it will be transmitted as three packets, namely packet A, packet B, and packet C. It will be a appreciated the reason why data has become available for uplink transmission and the information content of the data itself are not significant to the principles described herein. However, in accordance with certain implementations the processing described herein may be applied in respect of certain types of data, for example data which is delay intolerant (such as URLLC data), and not for other types of data, for example, data that is classified as delay tolerant. In that regard, delay tolerant data may be retained by the terminal device for later transmission after it has been determined the handover procedure has completed.

In step S5 the terminal device transmits packet A. The terminal device is layer 1 synchronised to the target cell and so this packet is received at the target network access node 206 in layer 1. However, for this example it is assumed the terminal device has not yet achieved layer 2 synchronisation with the target network access node. That is to say, packet A is prepared for transmission in a packet processing entity (e.g. PDCP entity) of the terminal device using a cipher key associated with the source network access node. On receiving packet A, the target network access node determines that it is unable to decipher the packet. This may be determined in various ways. For example, in some implementations the target network access node may be configured to recognise a received packet has been ciphered with a cipher key associated with the source network access node if during a handover procedure the target network access node receives a packet it cannot decipher at layer 2.

In step S6, having determined that it cannot decipher packet A, the target network access node forwards the packet to the source network access node.

In step S7, having received packet A from the target network access node, the source network access node deciphers the packet using the appropriate cipher key.

In step S8, having deciphered packet A in step S7, the source network access node forwards the data from packet A to the core network 202 for onward routing in the usual way.

In step S9 the terminal device transmits packet B. As noted above, at this stage of the processing represented in FIG. 6, the terminal device is layer 1 synchronised to the target cell and so this packet is also received at the target network access node 206 in layer 1. However, for this example it is assumed the terminal device has still not yet achieved layer 2 synchronisation with the target network access node. That is to say, packet B is prepared for transmission in a packet processing entity of the terminal device using a cipher key associated with the source network infrastructure equipment. On receiving packet B, the target network access node determines that it is unable to decipher the packet, such as discussed above in relation to packet A.

In step S10, having determined that it cannot decipher packet B, the target network access node forwards the packet to the source network access node.

In step S11, having received packet B from the target network access node, the source network access node deciphers the packet using the appropriate cipher key.

In step S12, having deciphered packet B in step S11, the source network access node forwards the data from packet B to the core network 202 for onward routing in the usual way.

In step S13 it is assumed the terminal device achieves layer 2 synchronisation with the target network access node 206. That is to say, in step S13 the terminal device has obtained the relevant layer 2 cipher key for communicating data to the packet processing entity in the target network access node 206. In this regard, the layer 2 synchronisation and associated key exchange may be performed in accordance with conventional techniques.

In step S14, having determined it is now layer 2 synchronised to the target cell, the terminal device transmits an indicator (end marker) to the target network access node to indicate it has finished transmitting packets that are ciphered with the source key, and will transmit packets ciphered with the target key going forwards. The manner in which the end marker is transmitted from the terminal device to the target network access node is not significant. For example, in some cases it may be transmitted as a stand-alone and message, and in other cases it may be transmitted in association with the last of the transmissions made using the source cipher key or in association with the first of the transmissions made using the target cipher key.

In step S15, having received the end marker from the terminal device, the target network access node transmits an indication the end marker has been received to the source network access node. This informs the source network access node that it will no longer receive packets of data from the target network access node in association with the handover of the terminal device, so that the source network access node can release any resources it has reserved to support the terminal device.

In step S16 the terminal device transmits packet C. As noted above, at this stage of the processing represented in FIG. 6, the terminal device is layer 1 synchronised to the target cell and by the time it comes to prepare packet C is also layer 2 synchronised to the target cell. Thus packet C is prepared for transmission in a packet processing entity of the terminal device using an updated cipher key associated with the target network access node.

In step S17, having received packet C, the target network access node is able to decipher the packet in the usual way.

In step S18, having deciphered packet C in step S17, the target network access node forwards the data from packet C to the core network 202 for onward routing in the usual way.

Thus the processing discussed above in relation to FIGS. 5 and 6 can help address issues that may arise when a terminal device transmits uplink data to one network access node using a cipher key associated with another network access node. Wireless telecommunications systems are typically configured to ensure this scenario does not normally arise, however the inventors have recognised a desire to avoid data loss/delays in association with uplink data transmitted from a terminal device using grant-free resources during a handover procedure can mean it may be advantageous to allow uplink transmissions which are synchronised to different network access nodes at layer 1 and layer 2.

In the example set out above in relation to FIG. 6, it is assumed the terminal device achieves layer 1 synchronisation to the target cell before the terminal device achieves layer 2 synchronisation to the target cell. However, in principle there may also be scenarios in which a terminal device achieves layer 2 synchronisation to a target cell before it achieves layer 1 synchronisation to the target cell. This can result in situations in which the terminal device transmits data to the source network access node that is ciphered with a key associated with the target network access node. An approach corresponding to that set out in FIG. 6 may be adopted in this case, such as represented in FIG. 7.

Figure 7:
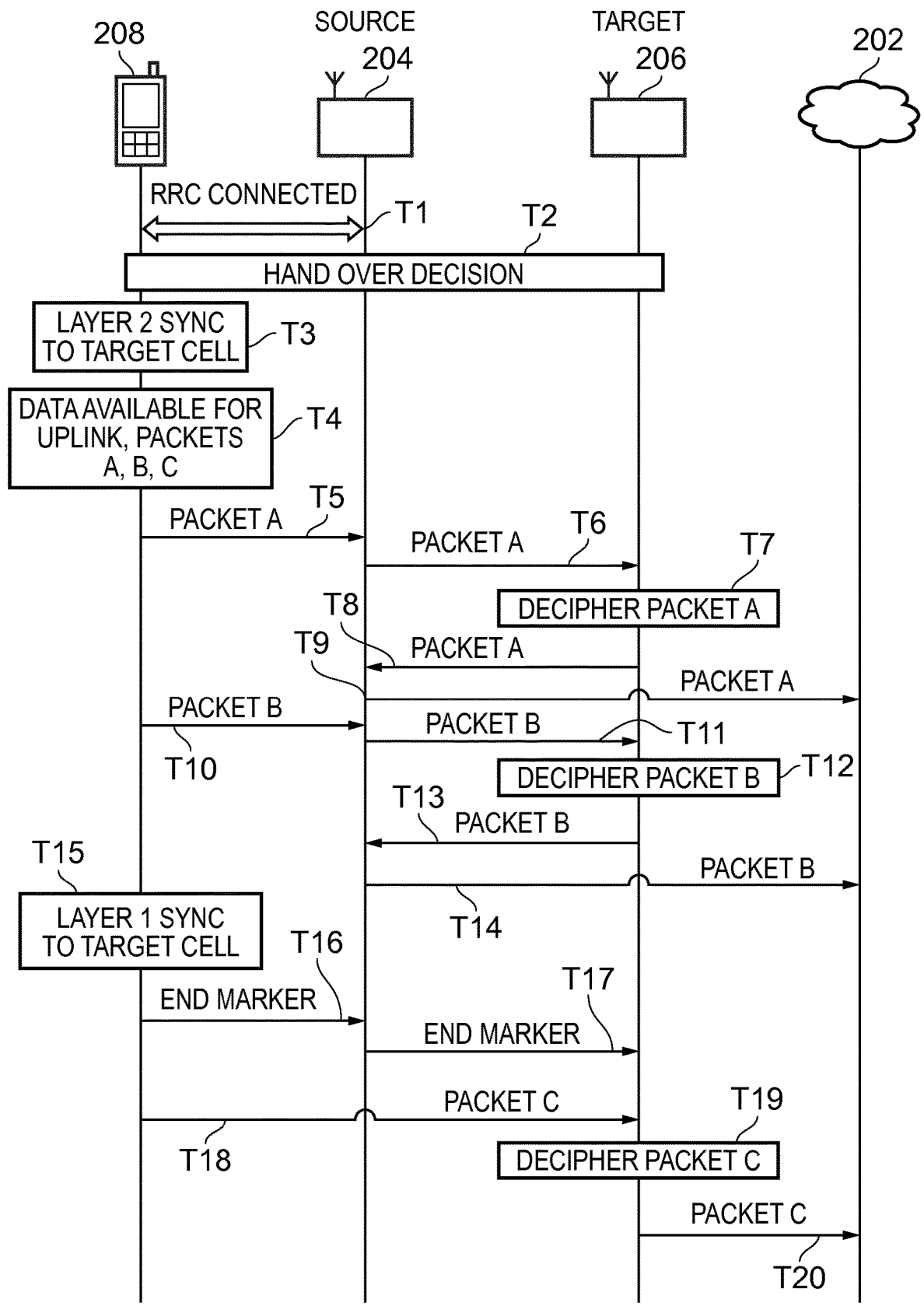

FIG. 7 is a ladder diagram schematically representing some operating aspects of the wireless telecommunications system 200 as discussed above with reference to FIG. 5 in accordance with certain embodiments of the disclosure. In particular, the diagram represents some operations and signalling exchange associated with the terminal device 208, the source network access node 204, the target network access node 206 and the core network 202 in accordance with certain embodiments of the disclosure.

The processing represented in FIG. 7 starts in step T1 in which it is assumed the terminal device 208 is active on the source cell (i.e. the terminal device is RRC connected to the source network access node).

In step T2 it is determined the terminal device 208 should be handed over from the source cell to the target cell. The manner in which it is determined whether or not to hand over from the source cell to the target cell is not of primary significance to the principles described herein. For example, in accordance with certain implementations it may be based on conventional techniques, for example taking account of measurements of radio channel conditions between the terminal device and the respective network access nodes.

Following the decision to handover the terminal device from the source network access node to the target network access node, the terminal device achieves layer 2 synchronisation to the target cell. That is to say, the terminal device establishes a cipher key to use for layer 2 ciphering for communications with the target network access node. However, in this example scenario it is assumed the terminal device has not yet achieved layer 1 synchronisation to the target cell but remains layer 1 synchronised to the source cell.

In step T4 the terminal device determines that data has become available for uplink, and in this example it is assumed the amount of data is such that it will be transmitted as three packets, namely packet A, packet B, and packet C. It will be a appreciated the reason why data has become available for uplink transmission, and the information content of the data, is not significant to the principles described herein. However, in accordance with certain implementations the processing described herein may be applied in respect of certain types of data, for example data which is delay intolerant (such as URLLC data), and not for other types of data, for example, data that is classified as delay tolerant. In that regard, delay tolerant data may be retained by the terminal device for later transmission after it has been determined the handover procedure has completed (i.e. with synchronisation having been achieved in layer 1 and layer 2).

In step T5 the terminal device transmits packet A. The terminal device is layer 1 synchronised to the source cell and so this packet is received at the source network access node 204 in layer 1. However, because the terminal device has already achieved layer 2 synchronisation with the target network access node, packet A is prepared for transmission in a packet processing entity (e.g. PDCP entity) of the terminal device using a cipher key associated with the target network access node. On receiving packet A, the source network access node determines that it is unable to decipher the packet. This may be determined in various ways. For example, in some implementations the source network access node may be configured to recognise a received packet has been ciphered with a cipher key associated with the target network access node if it receives a packet it cannot decipher at layer 2 around the time of a handover procedure.

In step T6, having determined that it cannot decipher packet A, the source network access node forwards the packet to the target network access node.

In step T7, having received packet A from the source network access node, the target network access node deciphers the packet using the appropriate cipher key.

After having deciphered packet A in step T7, the target network node may in some cases be in a position to forward the data from packet A directly to the core network 202 for onward routing in the usual way. However, in this example it is assumed at the stage of the processing represented in step T7 in FIG. 7 (i.e. when the target network node deciphers packet A), the target network node has not yet established a connection through to the core network in respect of communications from the terminal device. Consequently, in this example the target network access node 206 is unable to forward the data from packet a directly to the core network 202, and so, as schematically represented in step T8, after having deciphered packet A in step T7, the target network access node forwards the deciphered data from packet A back to the source network 202.

In step T9, having received the deciphered data for packet A from the target network access node in step T8, the source network access node forwards the data from packet A to the core network 202 for onward routing in the usual way.

Steps T10, T11, T12, T13 and T14 represented in FIG. 7 are respectively similar to, and will be understood from, Steps T5, T6, T7, T8 and T9, but relate to the uplink transmission of packet B rather than packet A.

In step T15 it is assumed the terminal device achieves layer 1 synchronisation with the target network access node 206. In this regard, the layer 1 synchronisation may be achieved in accordance with conventional techniques.

In step T16, having determined it is now both layer 1 and layer 2 synchronised to the target cell, the terminal device transmits an indicator (end marker) to the target network access node to indicate it has finished transmitting packets to the source network which are ciphered with the target key, and will going forwards transmit packets ciphered with the target key to the target network. The manner in which the end marker is transmitted from the terminal device to the target network access node is not significant. For example, in some cases it may be transmitted as a stand-alone message, and in other cases it may be transmitted in association with the last of the transmissions made using the source cipher key or in association with the first of the transmissions made using the target cipher key.

In step T17, having received the end marker from the terminal device, the source network access node transmits an indication the end marker has been received to the target network access node.

In step T18 the terminal device transmits packet C. As noted above, at this stage of the processing represented in FIG. 7, the terminal device is both layer 1 synchronised and layer 2 synchronised to the target cell. Thus packet C is prepared for transmission in a packet processing entity of the terminal device using an updated cipher key associated with the target network access node.

In step T19, having received packet C, the target network access node is able to decipher the packet in the usual way.

In this example it is assumed by this stage of the processing represented in FIG. 7 the target network access node has now established a connection through to the core network 202 in respect of communications associated with the terminal device, and so in step T20, having deciphered packet C in step T19, the target network access node forwards the data from packet C to the core network 202 for onward routing in the usual way.

It will be appreciated the processing set out in the ladder diagrams of FIGS. 6 and 7 represents some specific example implementations for the sake of explanation, and these approaches may be modified in different implementations. For example, in some cases the terminal device may be configured to transmit a cipher indication in association with it uplink transmissions, whereby the cipher indication provides an indication of whether or not a packet has been ciphered at layer 2 with a cipher key associated with the network access node which receives the packet in layer 1. For example, in some implementations, the layer 2 processing entity in the terminal device (e.g. PDCP layer) responsible for preparing packets for uplink transmission may include such an indicator in the packet header to indicate whether the packet has been ciphered with the source or target cell key. In implementations in which an entry is introduced in the PDCP packet header to indicate which cipher key was used for the packet, e.g. a single bit set to "0" for packets ciphered with source key and set to "1" for packets ciphered with target key, the indication may be set to a value associated with using a source cell key once it is determined the terminal device and the network both are able to decode a number of packets successfully using the target key. This reflects the fact that once communications using the target key are established in the target cell, it may be expected the for the next handover the target cell will in fact be a source cell, and so setting the relevant bit to indicate the data are ciphered with a source cell key early can help facilitate faster subsequent handovers. In some cases more than one bit may be introduced in the PDCP packet header to allow an indication from a larger number of keys, e.g. "00" may correspond to a first source cell, "01" for a first target cell, "10" for a second target cell, "11" for a third target cell, and then reset to "00" for a fourth target cell. This can help resolve ambiguity in situation where a number of handovers might occur quickly, While the above description has to some extent focussed on applications of the principles described herein in the context of a handover procedure, similar approaches can be adopted in other scenarios, for example in association with an implementation of dual connectivity. The concept of dual connectivity (DC) was introduced in Release 12 of the 3GPP standard governing the LTE architectures and it is expected corresponding functionality will also be provided in new RAT (NR) networks. In dual connectivity, network access nodes are specified as being either a master network access node or a secondary network access node, and user equipment can connect to the network through both network access nodes at the same time (e.g. see [6], in particular, Section 6.5). The approaches described herein may be adopted in a scenario in which a secondary network access node is to change role and become a master network access node. In such a scenario a terminal device may receive an RRC Reconfiguration message instructing the terminal device of a change the role of a secondary network access node changing to a master network access node. Since the terminal device is already layer 1 synchronised to the secondary network access node (e.g. through a random access procedure performed as part of the initial secondary network access node configuration), the terminal device is able to transmit packets on uplink to the secondary network access node, now taking the role of master network access node, on, for example, grant-free resources. Packets in the terminal device's layer 2 buffer may, however, be ciphered using the previous master network access node key, and so similar principles to those described above may be adopted to allow for these to be deciphered in the network.

Thus there has been described first network access node for use in association with a handover procedure for a terminal device involving the first network access node and a second network access node in a wireless telecommunications network comprising the first network access node, the second network access node, the terminal device, and a core network part, wherein the first network access node comprises controller circuitry and transceiver circuitry configured to operate together such that the first network access node is operable to: receive a block of uplink data from the terminal device; establish whether the block of data has been ciphered by the terminal device using a cipher key corresponding to a first cipher key associated with the first network access node or corresponding to a second cipher key associated with the second network access node; in response to establishing the block of data has been ciphered using a cipher key corresponding to the first cipher key, decipher the block of data using the first cipher key, and to forward the deciphered block of data to the core network part; and in response to establishing the block of data has been ciphered using a cipher key corresponding to the second cipher key, forward the block of data to the second network access node.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the terminal device. It will be appreciated such predetermined/predefined information may in general be established, for example, by definition in an operating standard for the wireless telecommunication system, or in previously exchanged signalling between the base station and terminal devices, for example in system information signalling, or in association with radio resource control setup signalling. That is to say, the specific manner in which the relevant predefined information is established and shared between the various elements of the wireless telecommunications system is not significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not significance to the principles of operation described herein.

Respective features of the present disclosure are defined by the following numbered paragraphs:

Paragraph 1. A first network access node configured for use in a wireless telecommunications system comprising the first network access node, a second network access node and a terminal device, wherein the first network access node comprises controller circuitry and transceiver circuitry configured to operate together such that the first network access node is operable to: receive a block of uplink data from the terminal device; establish whether the block of data was ciphered by the terminal device using a cipher key corresponding to a first cipher key associated with the first network access node or corresponding to a second cipher key associated with the second network access node; in response to establishing the block of data has been ciphered using a cipher key corresponding to the first cipher key, decipher the block of data using the first cipher key; and in response to establishing the block of data has been ciphered using a cipher key corresponding to the second cipher key, forward the block of data to the second network access node.

2. The first network access node of paragraph 1, wherein the first network access node is configured to establish whether the block of data was ciphered by the terminal device using a cipher key corresponding to the first cipher key or the second cipher key based on an indication received from the terminal device.

Paragraph 3. The first network access node of paragraph 2, wherein the indication received from the terminal device comprises an entry in a header for the data block.

Paragraph 4. The first network access node of paragraph 2, wherein the indication received from the terminal device comprises an end marker transmitted by the terminal device to indicate when the terminal switches from ciphering uplink data using a cipher key corresponding to the second cipher key to the first cipher key.

Paragraph 5. The first network access node of any of paragraphs 1 to 4, wherein the first network access node is configured to establish whether the block of data was ciphered by the terminal device using a cipher key corresponding to the first cipher key or the second cipher key based on an attempt to decipher the block of data using the first cipher key.

Paragraph 6. The first network access node of any of paragraphs 1 to 5, wherein first network access node comprises a target network access node for a handover procedure for the terminal device involving the first network access node and the second network access node.

Paragraph 7. The first network access node of any of paragraphs 1 to 6, wherein first network access node comprises a source network access node for a handover procedure for the terminal device involving the first network access node and the second network access node.

Paragraph 8. The first network access node of any of paragraphs 1 to 7, wherein in response to establishing the block of data has been ciphered using a cipher key corresponding to the first cipher key and deciphering the block of data using the first cipher key, the first network access node is further configured to forward the deciphered block of data to a core network part of the wireless telecommunications system.

Paragraph 9. The first network access node of any of paragraphs 1 to 8, wherein in response to establishing the block of data has been ciphered using a cipher key corresponding to the second cipher key and forwarding the block of data to the second network access node, the first network access node is further configured to receive the deciphered block of data back from the second network access node after the second network access node has deciphered the block of data using the second cipher key.

Paragraph 10. The first network access node of any of paragraphs 1 to 9, wherein the first network access node is further configured to forward the deciphered block of data received from the second network access node to a core network part of the wireless telecommunications system.

Paragraph 11. The first network access node of any of paragraphs 1 to 10, wherein the first network access node is configured to receive a block of uplink data from the terminal device on grant-free radio resources.

Paragraph 12. Circuitry for a first network access node configured for use in a wireless telecommunications system comprising the first network access node, a second network access node and a terminal device, wherein the circuitry comprises controller circuitry and transceiver circuitry configured to operate together such that the circuitry is operable to: receive a block of uplink data from the terminal device; establish whether the block of data was ciphered by the terminal device using a cipher key corresponding to a first cipher key associated with the first network access node or corresponding to a second cipher key associated with the second network access node; in response to establishing the block of data has been ciphered using a cipher key corresponding to the first cipher key, decipher the block of data using the first cipher key; and in response to establishing the block of data has been ciphered using a cipher key corresponding to the second cipher key, forward the block of data to the second network access node.

Paragraph 13. A method of operating a first network access node in a wireless telecommunications system comprising the first network access node, a second network access node and a terminal device, wherein the method comprises: receiving a block of uplink data from the terminal device; establishing whether the block of data was ciphered by the terminal device using a cipher key corresponding to a first cipher key associated with the first network access node or corresponding to a second cipher key associated with the second network access node; in response to establishing the block of data has been ciphered using a cipher key corresponding to the first cipher key, deciphering the block of data using the first cipher key; and in response to establishing the block of data has been ciphered using a cipher key corresponding to the second cipher key, forwarding the block of data to the second network access node.

Paragraph 14. A second network access node configured for use in a wireless telecommunications system comprising a first network access node, the second network access node and a terminal device, wherein the second network access node comprises controller circuitry and transceiver circuitry configured to operate together such that the second network access node is operable to: receive from the first network access node a block of uplink data received by the first network access node from the terminal device, wherein the block of data was transmitted to the first network access node but ciphered by the terminal device using a cipher key corresponding to a second cipher key associated with the second network access node rather than a cipher key corresponding to a first cipher key associated with the first network access node; decipher the block of data using the second cipher key; and subsequently receive from the first network access node an indication the first network access node has received an indication from the terminal device to indicate the terminal device will not send further data ciphered with a cipher key corresponding to the second cipher key.

Paragraph 15. The second network access node of paragraph 14, wherein the second network access node is configured to forward the deciphered the block of data to a core network part of the wireless telecommunications system.

Paragraph 16. The second network access node of paragraph 14 or 15, wherein the second network access node is configured to forward the deciphered the block of data to the first network access node.

Paragraph 17. The second network access node of any of paragraphs 14 to 16, wherein the second network access node is configured to release resources reserved for use to support communications from the terminal device in response to receiving from the first network access node an indication the first network access node has received an indication from the terminal device to indicate the terminal device will not send further data ciphered with a cipher key corresponding to the second cipher key.

Paragraph 18. Circuitry for a second network access node configured for use in a wireless telecommunications system comprising a first network access node, the second network access node and a terminal device, wherein the circuitry comprises controller circuitry and transceiver circuitry configured to operate together such that the circuitry is operable to: receive from the first network access node a block of uplink data received by the first network access node from the terminal device, wherein the block of data was transmitted to the first network access node but ciphered by the terminal device using a cipher key corresponding to a second cipher key associated with the second network access node rather than a cipher key corresponding to a first cipher key associated with the first network access node; decipher the block of data using the second cipher key; and subsequently receive from the first network access node an indication the first network access node has received an indication from the terminal device to indicate the terminal device will not send further data ciphered with a cipher key corresponding to the second cipher key.

Paragraph 19. A method of operating a second network access node in a wireless telecommunications system comprising a first network access node, the second network access node and a terminal device, wherein the method comprises: receiving from the first network access node a block of uplink data received by the first network access node from the terminal device, wherein the block of data was transmitted to the first network access node but ciphered by the terminal device using a cipher key corresponding to a second cipher key associated with the second network access node rather than a cipher key corresponding to a first cipher key associated with the first network access node; deciphering the block of data using the second cipher key; and subsequently receiving from the first network access node an indication the first network access node has received an indication from the terminal device to indicate the terminal device will not send further data ciphered with a cipher key corresponding to the second cipher key.

Paragraph 20. A terminal device configured for use in a wireless telecommunications system comprising the terminal device, a first network access node and a second network access node, wherein the terminal device comprises controller circuitry and transceiver circuitry configured to operate together such that the terminal device is operable to: transmit a block of uplink data to the first network access node, wherein the block of data is ciphered by the terminal device using a cipher key corresponding to a second cipher key associated with the second network access node rather than a cipher key corresponding to a first cipher key associated with the first network access node; and subsequently transmit to the first network access node an indication the terminal device will not send further data ciphered with a cipher key corresponding to the second cipher key.

Paragraph 21. The terminal device of paragraph 20, wherein the terminal device is configured to transmit the indication the terminal device will not send further data ciphered with a cipher key corresponding to the second cipher key in response to achieving layer 2 synchronisation with the first network access node.

Paragraph 22. The terminal device of paragraph 20 or 21, wherein the terminal device is configured to transmit an indication of the cipher key used to encipher the data in a header for the data block.

Paragraph 23. The terminal device of paragraph 22, wherein the indication of the cipher key used to encipher the data in a header for the data block comprises a plurality of bits for indicating more than two cipher keys respectively associated with more than two network access nodes.

Paragraph 24. Circuitry for a terminal device configured for use in a wireless telecommunications system comprising the terminal device, a first network access node and a second network access node, wherein the circuitry comprises controller circuitry and transceiver circuitry configured to operate together such that the circuitry is operable to: transmit a block of uplink data to the first network access node, wherein the block of data is ciphered by the terminal device using a cipher key corresponding to a second cipher key associated with the second network access node rather than a cipher key corresponding to a first cipher key associated with the first network access node; and subsequently transmit to the first network access node an indication the terminal device will not send further data ciphered with a cipher key corresponding to the second cipher key.

Paragraph 25. A method of operating a terminal device in in a wireless telecommunications system comprising the terminal device, a first network access node and a second network access node, wherein the method comprises: transmitting a block of uplink data to the first network access node, wherein the block of data is ciphered by the terminal device using a cipher key corresponding to a second cipher key associated with the second network access node rather than a cipher key corresponding to a first cipher key associated with the first network access node; and subsequently transmitting to the first network access node an indication the terminal device will not send further data ciphered with a cipher key corresponding to the second cipher key.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] 3GPP document RP-160671, "New SID Proposal: Study on New Radio Access Technology," NTT DOCOMO, RAN#71, Gothenburg, Sweden, 7 to 10. March, 2016.

[2] Holma H. and Toskala A, "LTE for UMTS OFDMA and SC-FDMA based radio access", John Wiley and Sons, 2009.

[3] "Conditional Handover", 3GPP TSG RAN WG2 Meeting #97, R2-1700864, Athens, Greece 13- 17 Feb. 2017.

[4] "NW controlled autonomous handover in single connectivity", 3GPP TSG RAN WG2 Meeting #97, R2-1701711, Athens, Greece 1317 Feb. 2017.

[5] "Introduction of UE autonomous mobility", 3GPP TSG RAN WG2 Meeting #97, R2-1701360, Athens, Greece 13- 17 Feb. 2017.

[6] ETSI TS 136 300 V13.2.0 (January 2016)/3GPP TS 36.300 version 13.2.0 Release 13

What is claimed is:

1. A first network access node configured for use in a wireless telecommunications system comprising the first network access node, a second network access node and a terminal device, wherein the first network access node comprises controller circuitry and transceiver circuitry configured to operate together such that the first network access node is operable to:
   receive a block of uplink data from the terminal device;
   establish whether the block of data was ciphered by the terminal device using a cipher key corresponding to a first cipher key associated with the first network access node or corresponding to a second cipher key associated with the second network access node, wherein the first network access node is configured to receive a block of uplink data from the terminal device on grant-free radio resources;
   in response to establishing the block of data has been ciphered using a cipher key corresponding to the first cipher key, decipher the block of data using the first cipher key; and
   in response to establishing the block of data has been ciphered using a cipher key corresponding to the second cipher key, forward the block of data to the second network access node.

2. The first network access node of claim 1, wherein the first network access node is configured to establish whether the block of data was ciphered by the terminal device using a cipher key corresponding to the first cipher key or the second cipher key based on an indication received from the terminal device.

3. The first network access node of claim 2, wherein the indication received from the terminal device comprises an entry in a header for the data block.

4. The first network access node of claim 2, wherein the indication received from the terminal device comprises an end marker transmitted by the terminal device to indicate when the terminal switches from ciphering uplink data using a cipher key corresponding to the second cipher key to the first cipher key.

5. The first network access node of claim 1, wherein the first network access node is configured to establish whether the block of data was ciphered by the terminal device using a cipher key corresponding to the first cipher key or the second cipher key based on an attempt to decipher the block of data using the first cipher key.

6. The first network access node of claim 1, wherein first network access node comprises a target network access node for a handover procedure for the terminal device involving the first network access node and the second network access node.

7. The first network access node of claim 1, wherein first network access node comprises a source network access node for a handover procedure for the terminal device involving the first network access node and the second network access node.

8. The first network access node of claim 1, wherein in response to establishing the block of data has been ciphered using a cipher key corresponding to the first cipher key and deciphering the block of data using the first cipher key, the first network access node is further configured to forward the deciphered block of data to a core network part of the wireless telecommunications system.

9. The first network access node of claim 1, wherein in response to establishing the block of data has been ciphered using a cipher key corresponding to the second cipher key and forwarding the block of data to the second network access node, the first network access node is further configured to receive the deciphered block of data back from the second network access node after the second network access node has deciphered the block of data using the second cipher key.

10. The first network access node of claim 1, wherein the first network access node is further configured to forward the deciphered block of data received from the second network access node to a core network part of the wireless telecommunications system.

11. A terminal device configured for use in a wireless telecommunications system comprising the terminal device, a first network access node and a second network access node, wherein the terminal device comprises controller circuitry and transceiver circuitry configured to operate together such that the terminal device is operable to:
  transmit a block of uplink data to the first network access node, wherein the block of data is ciphered by the terminal device using a cipher key corresponding to a second cipher key associated with the second network access node rather than a cipher key corresponding to a first cipher key associated with the first network access node, wherein the terminal device is configured to transmit an indication of the cipher key used to encipher the data in a header for the data block; and
  subsequently transmit to the first network access node an indication the terminal device will not send further data ciphered with a cipher key corresponding to the second cipher key.

12. The terminal device of claim 11, wherein the terminal device is configured to transmit the indication the terminal device will not send further data ciphered with a cipher key corresponding to the second cipher key in response to achieving layer 2 synchronisation with the first network access node.

13. The terminal device of claim 11, wherein the indication of the cipher key used to encipher the data in a header for the data block comprises a plurality of bits for indicating more than two cipher keys respectively associated with more than two network access nodes.

14. A first network access node configured for use in a wireless telecommunications system comprising the first network access node, a second network access node and a terminal device, wherein the first network access node comprises controller circuitry and transceiver circuitry configured to operate together such that the first network access node is operable to:
  receive a block of uplink data from the terminal device;
  establish whether the block of data was ciphered by the terminal device using a cipher key corresponding to a first cipher key associated with the first network access node or corresponding to a second cipher key associated with the second network access node, wherein:
    the first network access node comprises a target network access node for a handover procedure for the terminal device involving the first network access node and the second network access node, or
    the first network access node comprises a source network access node for a handover procedure for the terminal device involving the first network access node and the second network access node;
  in response to establishing the block of data has been ciphered using a cipher key corresponding to the first cipher key, decipher the block of data using the first cipher key; and
  in response to establishing the block of data has been ciphered using a cipher key corresponding to the second cipher key, forward the block of data to the second network access node.

* * * * *